US009232060B2

(12) United States Patent
Costello et al.

(10) Patent No.: US 9,232,060 B2
(45) Date of Patent: Jan. 5, 2016

(54) MANAGEMENT OF CONTACT LISTS

(75) Inventors: John Costello, Galway (IE); David Murray, Galway (IE); Frank McGuire, Galway (IE); Martin Walker, Galway (IE)

(73) Assignee: AVAYA INC., Basking Ridge, NJ (US)

( * ) Notice: Subject to any disclaimer, the term of this patent is extended or adjusted under 35 U.S.C. 154(b) by 1502 days.

(21) Appl. No.: 12/250,246

(22) Filed: Oct. 13, 2008

(65) Prior Publication Data

US 2010/0091967 A1    Apr. 15, 2010

(51) Int. Cl.
*H04M 3/00* (2006.01)
*H04M 5/00* (2006.01)
*H04M 3/51* (2006.01)
*H04M 3/58* (2006.01)

(52) U.S. Cl.
CPC *H04M 3/51* (2013.01); *H04M 3/58* (2013.01); *H04M 2201/40* (2013.01)

(58) Field of Classification Search
USPC ............ 379/265.01–265.03, 0.06, 0.11–0.14, 379/265.06, 265.11–265.14
See application file for complete search history.

(56) References Cited

U.S. PATENT DOCUMENTS

| | | | |
|---|---|---|---|
| 2004/0042611 A1* | 3/2004 | Power et al. | 379/265.02 |
| 2005/0041793 A1* | 2/2005 | Fulton et al. | 379/211.01 |
| 2005/0166157 A1* | 7/2005 | Ollis et al. | 715/764 |
| 2008/0071544 A1* | 3/2008 | Beaufays et al. | 704/270.1 |
| 2008/0107100 A1* | 5/2008 | Begeja et al. | 370/352 |
| 2008/0147639 A1* | 6/2008 | Hartman et al. | 707/5 |

* cited by examiner

*Primary Examiner* — Oleg Asanbayev
(74) *Attorney, Agent, or Firm* — Maldjian Law Group LLC

(57) ABSTRACT

During communications sessions between an agent in a call center and a customer, it is often desirable that a secondary agent is consulted, the secondary agent perhaps more suited to the particular needs of the customer. It is preferred that the original agent is presented with a list of the best-suited agents with which to consult, if needs be. Accordingly, a system and method for managing a list of contacts for presentation to a user of a computer system (e.g. a call center agent) is disclosed. The system provides for the monitoring of live communications between an agent and a customer, and further provides for the detecting of a pattern of data in the monitored live communications interaction (e.g. utilising speech recognition to recognise use of a particular keyword). The system is then operable to present a list of suggested contacts to the agent, the suggested contacts chosen based on a match between selection criteria for that contact and on the particular data pattern detected.

6 Claims, 4 Drawing Sheets

MANAGEMENT OF CONTACT LISTS

TECHNICAL FIELD

This invention relates to the management of contact lists for presentation to a user of a computer system.

BACKGROUND ART

Contact lists (sometimes referred to as "buddy lists") include details of other parties available for contact by a user of a computer system. The user can select a member of the list and initiate communication with that list member, usually by operation of communications software such as an email client, an instant messaging (IM) client, or voice or video telephony software, or by an interface between the computer and an external piece of communications equipment, such as an external telephone driven by computer telephony integration (CTI) commands from the computer, which causes the external telephone to dial a supplied contact telephone number based on the information in the contact list.

The use of contact lists makes it easier for a user of a computer system to easily and seamlessly initiate contact with third parties, avoiding the necessity of remembering or looking up the contact details of the third party and entering those details into a communications application. Contact lists can be integrated into communications applications such as email, IM or telephony software, or they can be stored in a stand-alone application which manages and interacts with the email, IM or telephony software resident on the user's computer system. It is to be understood that a computer system can be a single computer or can be a distributed system in which different components and different pieces of software are physically separated on different machines.

It is known to employ server-based contact lists which are accessed by client software. The client software typically downloads either a personalised or a generic contact list from the server. Such client-server systems are preferable within large organisations as they allow resources to be concentrated, and allow contact details to be maintained and updated centrally. Users can personalise their own lists by adding members to or removing members from the list to be displayed on their own client application, and the server-based component can store one or more such personalised lists for each user.

Contact lists can also be integrated with a presence service which keeps track of the location, availability and current contact parameters of its users. As an example of a presence service, the session initiation protocol (SIP), widely used in voice over Internet Protocol (VoIP) telephony, can be employed as described in Request for Comments No. 3856 issued by the Internet Engineering Task Force (IETF RFC 3856), which is incorporated herein by reference in its entirety.

Within contact centers (or call centers) such contact lists are employed to permit the agents who communicate with customers to enlist the assistance of colleagues, supervisors or outside experts. By deploying contact lists to contact center agents within their workstation environment, and thereby providing the agents with access to such expertise, the agents can more readily and easily handle problems presented by the customers with whom they are in communication.

A drawback of current systems is that the default list of contacts presented to the agent, or even the agent's own personalised list, may not provide access to the best expertise which is actually available to deal with a current problem faced by an agent. This is particularly true where an agent has to cover a broad range of queries, or where a customer interaction covers several areas, or where an agent is required to handle an issue outside of her normal experience (since in such cases the agent's usual sources of help may be equally ill-equipped to help). Agents may not know who to ask for help if they are not familiar with the expertise of all available potential contacts.

DISCLOSURE OF THE INVENTION

The present invention provides a method, corresponding apparatus and corresponding computer program product for managing a list of contacts for presentation to a user of a computer system. Live communications interaction between a user and a remote party is monitored and a pattern of data in the monitored live communications interaction is detected. During the live communication, a record containing details of a plurality of contacts each having selection criteria associated therewith is accessed and at least one contact from the record is selected based on a match between the selection criteria and the pattern of data detected in the monitored live communications. A list of contacts for presentation on the computer system is then modified by the addition or removal of a contact to or from the list of contacts.

Using embodiments of the invention, during communications sessions between an agent in a call center and a customer, a secondary agent can be consulted, the secondary agent being more suited to the particular needs of the customer with the original agent being presented with a list of the best-suited agents with which to consult, if needs be.

The real-time monitoring of the communications interaction allows for the constant updating of a contact list presented to a user. This allows for the continual suggesting by the system of contacts that are more suitable to the current situation.

Preferably, the communications interface is a telephony interface and the step of monitoring a live communications interaction comprises conducting speech recognition on a stream of voice data passing through the interface.

Preferably, the communications interface is an interface employed by a human agent of a contact center, and wherein the computer system is a workstation provided for use by the human agent, the workstation also providing a contact center agent interface enabling the agent to control an interaction between the contact center and a remote party also involved in the communications interaction.

Preferably, the pattern of data comprises a keyword, and wherein the keyword is a selection criterion for a contact stored in the record.

Preferably, the method further comprises the initial steps of:
  f) receiving a subject code associated with the remote party;
  g) selecting at least one contact from the record, based on a match between one or more of the selection criteria and the subject code associated with the remote party; and
  (h) generating the list of contacts for presentation on the computer system, the list of contacts comprising at least the selected contacts.

Certain remote parties may have preferred subject matter associated with them, and the use of a subject code allows for the contact list to be generated appropriate to the likely needs of the remote parties in question.

Preferably, the method further comprises the steps of:
  i) presenting to the user the list of contacts;
  j) presenting to the user a selection control which is operable to select at least one filter option; and k) modifying the list of contacts based on the at least one filter option.

The user can also manipulate criteria for the adjustment of the contact list, allowing for greater flexibility of operation of the system.

BRIEF DESCRIPTION OF THE DRAWINGS

The invention will now be further illustrated by the following descriptions of embodiments thereof, given by way of example only with reference to the accompanying drawings, in which.

DETAILED DESCRIPTION OF PREFERRED EMBODIMENTS

Figure 1:
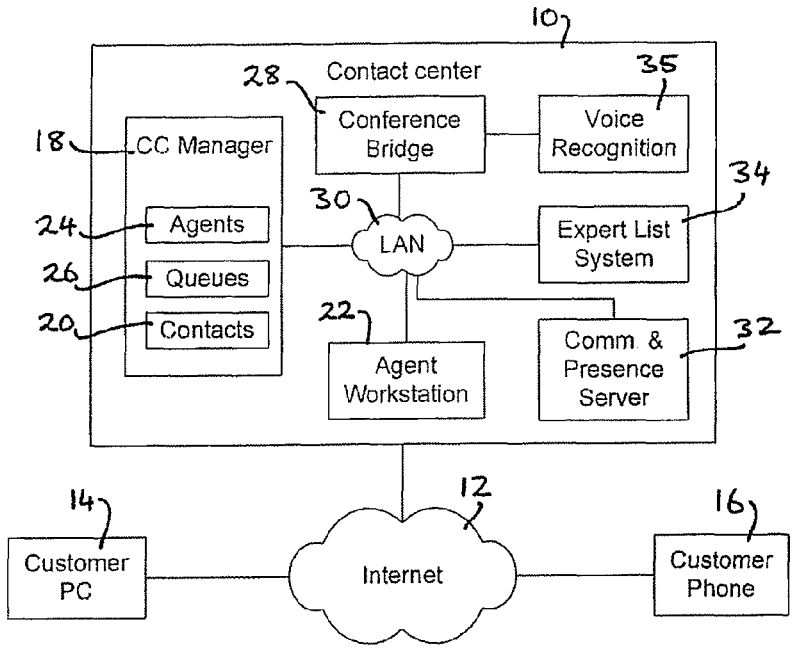
FIG. 1 is a block diagram network architecture including a contact center having a contact list management system.

FIG. 1 shows a network architecture including a contact center 10 connected to the Internet 12 to enable communication with customers who may connect to the Internet 12 via a PC 14 running appropriate communications software or a phone 16. Phone 16 may of course be an Internet-enabled phone, or it may connect via the public switched telephone network (PSTN), not shown.

In known manner, customers may initiate inbound communications to the contact center using a PC 14 or phone 16, and such inbound communications are typically captured by a contact center manager software application 18 as individual contacts 20. The contacts are analysed and handled automatically as far as possible (such as by using automated response systems and interactive voice response systems), not shown. For those contacts which require human intervention, a number of agents are employed at agent workstations 22, one of which is shown. The contact center manager 18 manages the resources of all of the agents 24, and matches the contacts 20 and agents 24 by using a number of queues 26, each of which will typically queue a number of contacts 20 to one or more agents 24 who have been determined to have suitable skillsets to handle the contacts.

When a contact 20 reaches the top of a queue 26 and an agent resource 24 is available to service that queue 26, the agent workstation 22 is placed in conference with the customer's connection from PC 14 or phone 16 at conference bridge 28 using a local area network (LAN) 30.

If the interaction between the customer and the contact center is not a voice or video telephony session but is some other type of live session, such as an instant messaging (IM) contact, the system will operate in a similar manner, analysing the IM automatically as far as possible, and then queuing the customer's IM session to an agent whose workstation 22 is provided with instant messaging software. When the customer and agent are placed in communication with one another using an IM server (not shown), the agent and customer type appropriate messages and send files to one another using typical IM capabilities, instead of speaking to one another over a voice connection.

The contact center and the interaction between the agent and the customer, as thus far described, are entirely conventional.

The contact center of FIG. 1 is also provided with a contact list capability, whereby the agent workstation 22 employs a contact list client application which presents to the agent a list of contacts via a graphical user interface allowing the agent to interact with the list and initiate communication via a number of communications programs, such as an instant messaging program, an email program, or a softphone telephony application which integrates with the agent's telephony connection.

The contact list client application interacts with a communication and presence server 32 which maintains in a central location the contact lists for presentation to all agents. The communications and presence server 32 can present to an agent, for example, a generic list of contacts, a predetermined personalised list of contacts specified by the agent, or a dynamically updated list including experts recommended by an expert list system 34 of the contact center.

Figure 2:
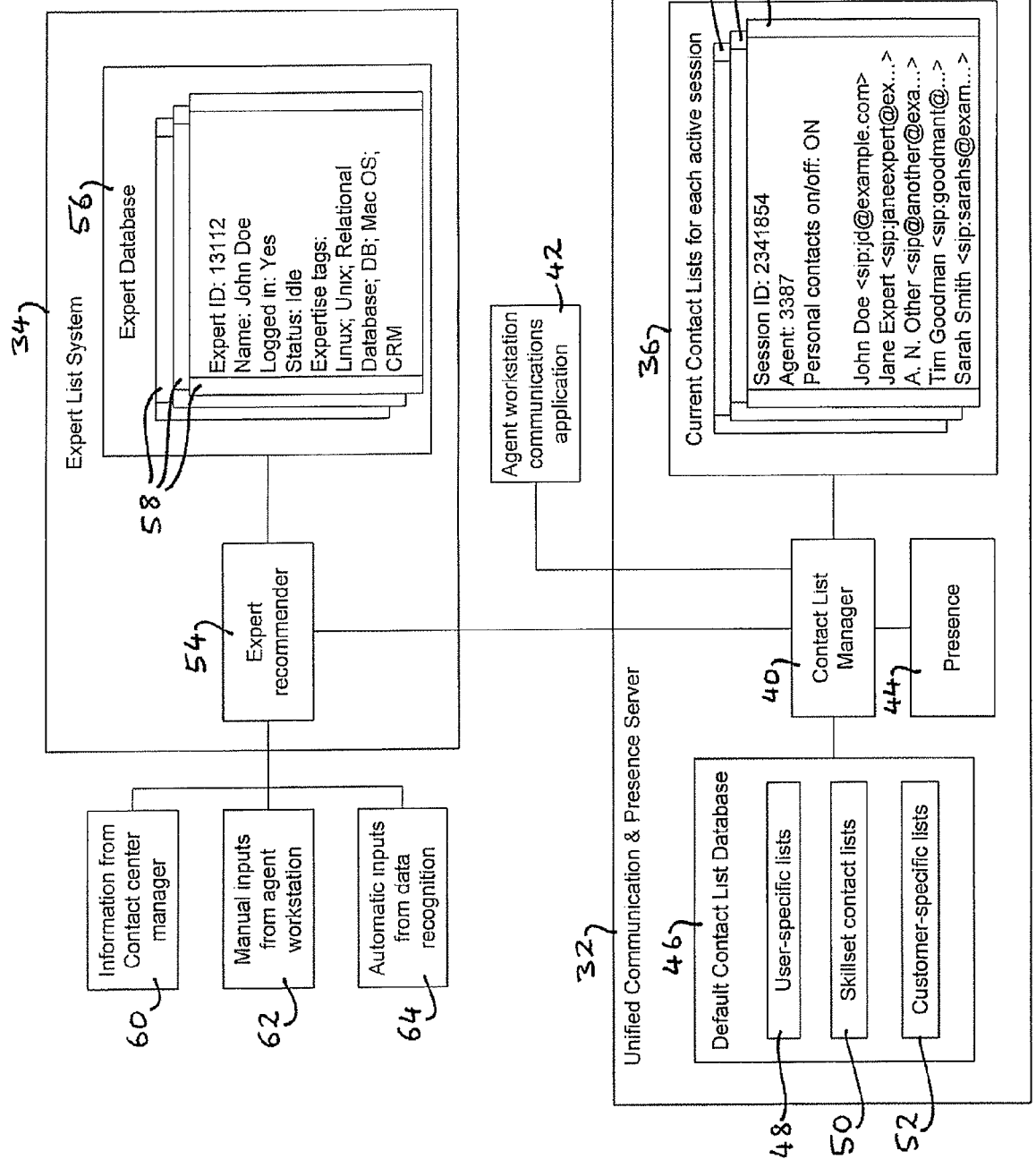
FIG. 2 is a block diagram providing greater detail on selected components of the contact center shown in FIG. 1.

FIG. 2 shows the expert list system 34 and the unified communication and presence server 32 in more detail to better illustrate their operation and interaction. The unified communication and presence server 32 maintains, in a memory area 36, data representing a plurality of contacts lists 38, with one list being maintained for each active agent session. A contact list manager 40 interfaces with a client communications application 42 on each agent workstation, such that the application maintains an up-to-date synchronised contact list 38, the content of which is determined by the contact list manager 40.

As indicated in FIG. 2, the list for each session contains a session ID, an agent ID (identifying the agent workstation or the login identity of the agent at that workstation), a flag indicating whether the agent's own personal contacts are to be conveyed or not (on/off), and an ordered list of contacts, each of which is identified with a label (such as "John Doe") and with a URI (such as using [SIP:jd@example.com]). The URI enables communication to be initiated to the specified person by means of a SIP server 44 in known manner. It is to be understood that the invention is in no way limited to an implementation using SIP URIs of SIP presence. What matters is that a contact list is provided to the agent such that the agent may interact with the list and initiate contact with a specified party.

If the personal contacts of the agent are "on" (which may be a supervisor session or may be an agent managed setting), then the contact list manager 40 consults a contact list database 46 to populate the personal contacts stored for the agent in question from one of a number of user-specific lists 48. The initial list may also be populated in accordance with a list of experts maintained for a particular skillset 50. The skillset may be selected on the basis of the agent's designated skillset, on the basis of the queue which the agent is servicing, or on the basis of the particular contact being serviced by the agent, the skillset for which may have been determined by the contact center systems in known manner.

Alternatively or additionally, the initial list may be populated with a number of experts who have been designated to deal with the particular customer or customer group, according to one of a number of customer-specific lists 52.

As a further option, the initial list may be blank when provided to the agent workstation, and the agent may select particular experts to populate the list from the default contact list database or any other source.

The contact list manager 40 may also be fed with specific experts from an expert recommender application 54 within the expert list system 34. The expert recommender system 54 has access to an expert database 56 which is populated with data describing characteristics of particular experts 58. For example, the data may include an expert ID, the name of the expert, a login status, an idle status, and one or more "tags" which are fields characterising the expertise of the expert against which searches may be made in order to select suitable experts.

The expert recommender 54 can receive inputs from several different sources, such as information from the contact center manager 60, manual inputs from the agent workstation 62, or automatic inputs from data recognition systems of the contact center 54, to give three examples.

Figure 3:
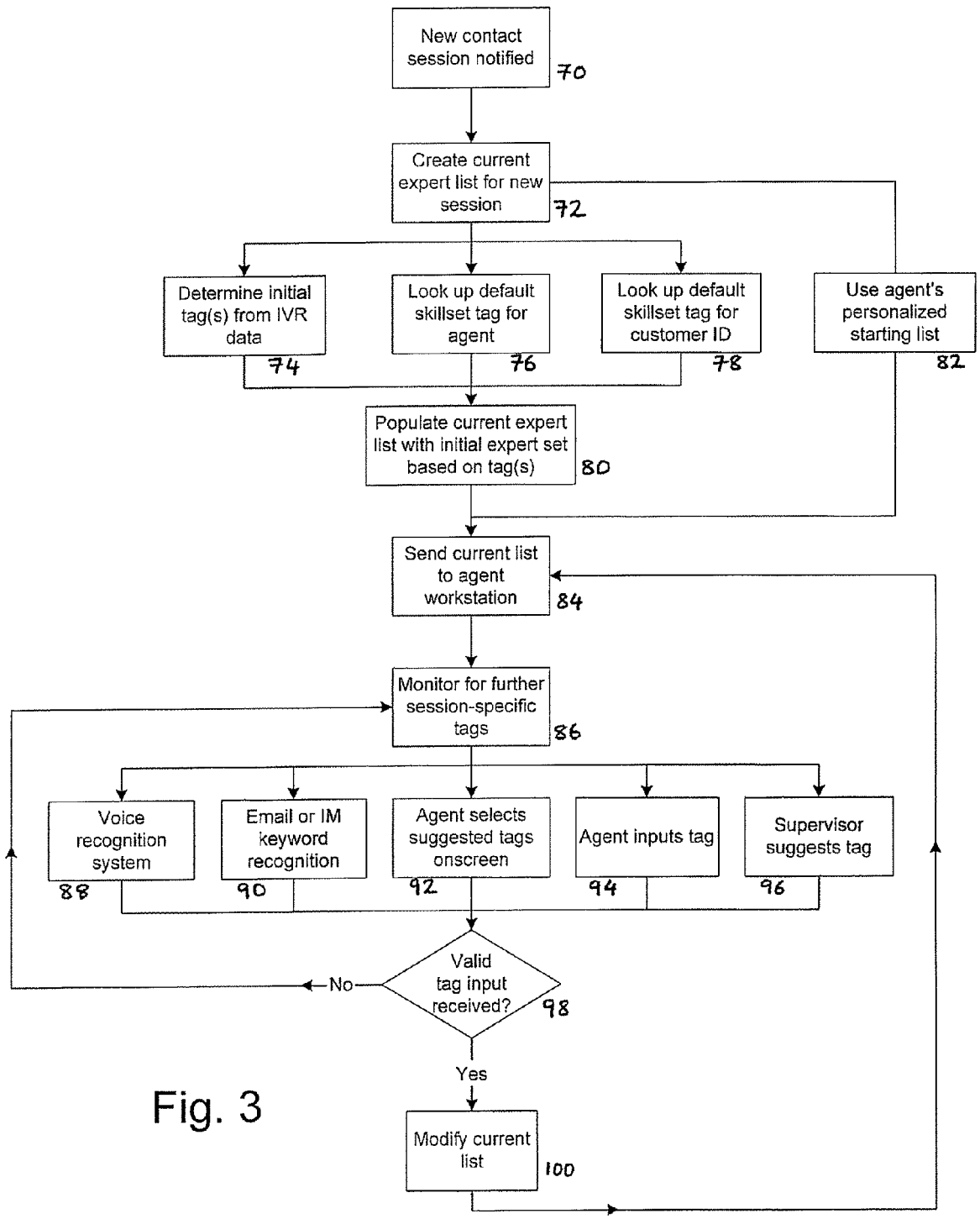
FIG. 3 is a flowchart of a method of managing contact lists in a contact center.

Referring to FIG. 3, a flowchart illustrates one mode of operation of the system of FIGS. 1 and 2. In step 70, a new contact session is notified to the contact list manager 40. For simplicity it will be assumed that the contact list manager 40 begins with a blank list for this contact session, i.e. for this agent in communication with the particular contact allocated to that agent (the contact may be an inbound contact or an outbound contact initiated by the agent). In step 72, the expert recommender 54 begins to create a current expert list for the new contact session. In doing so, a number of options may be followed. For example, the interactive voice response (IVR) data gathered during initial automated handling of the contact may determine one or more initial tags, step 74.

Alternatively, or additionally, a lookup table can be employed to determine one or more default skillset tags for the agent in question, step 76.

As a further alternative or additional source of expert selection data, the customer ID may have one or more skillset tags (or other tags) associated with it in a skillset table, which can be looked up, step 78. One or more of these sources of tags enables the expert recommender 54 to interrogate the expert database 56 and retrieve an appropriate set of expert records 58 based on the tag supplied to it. These expert identities are provided to the contact list manager 40, which populates the current expert list with this initial set of experts based on tags retrieved at the initiation of the contact session, step 80. A contact list 38 for this session and agent is populated and is sent to the agent workstation 42 upon request, step 84.

(As an alternative, there may be no initial collection of expert tags, and a user specific list 48 can be used as the agent's personalised starting list, step 82. The current list is sent to the agent workstation, step 84, providing the agent with a list of contacts, some of whom may be experts chosen according to the tags described previously.)

As the contact session continues, the expert recommender continues to monitor for additional session-specific tags, step 86.

Some sources of additional tags would include monitoring a voice recognition system 35 (FIG. 1), step 88, monitoring an email or instant messaging keyword recognition system, step 90, receiving an indication that the agent had selected a suggested tag provided in an onscreen application for that agent, step 92, receiving a direct input of a tag by an agent, step 94, or receiving a supervisor-suggested tag, step 96. In each case, the expert recommender 54 makes an initial determination as to whether a valid tag input has been received, decision 98. If not, the process reverts to step 86 and the expert recommender continues to monitor for additional tags. If, however, a valid tag input is received in decision 98, then the current list 38 is modified by the contact list manager 40, step 100, and this updated current list is sent to the agent workstation, with the process reverting to step 84.

In this way, the agent workstation communications application 42 is provided in real time with a dynamically modified list of contacts, and the content of this list is influenced, at least in part, by real-time communications data from the contact session being monitored. In other words, the opportunity arises to modify an agent's contact list based on the interaction that agent is having with a customer in real time.

Figure 4:
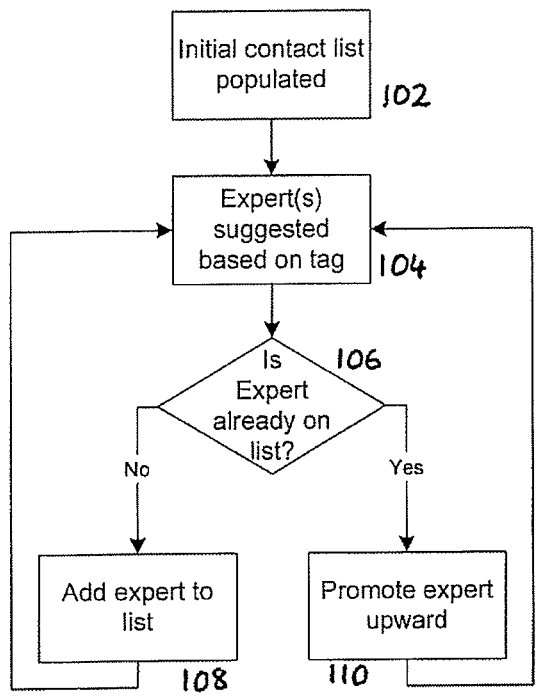
FIG. 4 is a flowchart illustrating a first method of updating a contact list.

Referring to FIG. 4, one example is described of how a list is modified (for example, in step 100 of FIG. 3).

In step 102, an initial contact list is populated. As described in relation to FIG. 3, an expert is suggested based on a tag, step 104. When an expert is located based on this tag, a determination is made as to whether that expert is already on the current contact list being provided to the agent handling the session in question, decision 106. If the expert is not already on the list, then the expert is added to the list, step 108. The position in which the expert is added is determined according to a set of rules which may be based on a weighting accorded to that particular agent, based on the newer agents being placed towards the top (or bottom) of the list, or in any other way.

If it is determined that the expert is already on the list, then this would suggest that the expert in question is of particular relevance, given that that expert satisfies a match with a tag detected in the contact session. In such cases, the expert will be promoted upward, step 110.

Figure 5:
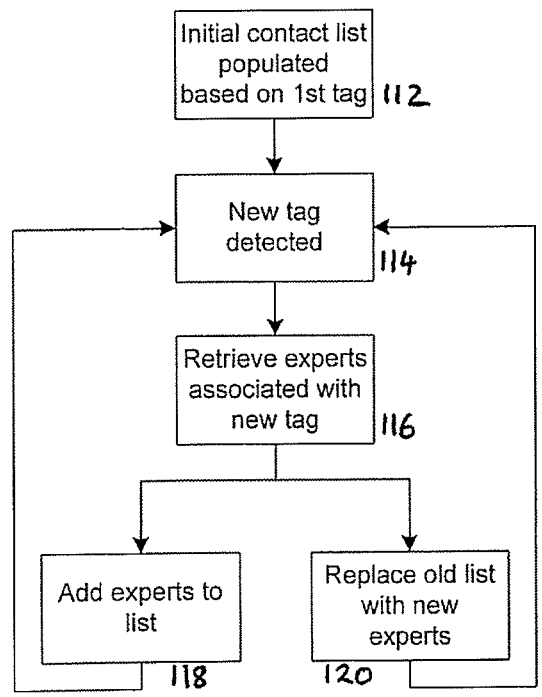
FIG. 5 is a flowchart illustrating a second method of updating a contact list.

In FIG. 5, an alternative mode of operation is described. An initial contact list is populated based on a first detected tag, step 112. When a new tag is detected, step 114, one or more experts associated with this new tag are retrieved by the expert recommender, step 116. These experts may either be added to the list, step 118, or the list may be replaced by the new experts, step 120.

Figure 6:
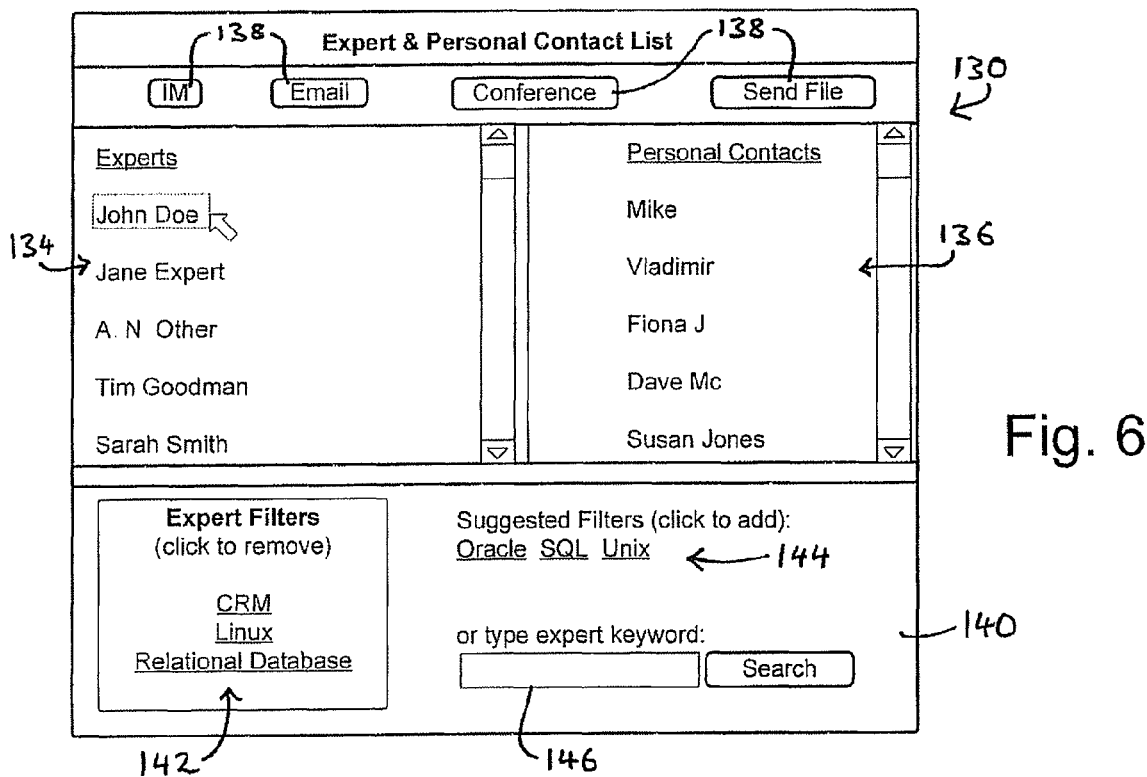
FIG. 6 is a stylised screenshot of a user interface for interacting with a contact list on a computer system.

FIG. 6 provides a mock-up screenshot of the client application interface employed by an agent.

In this interface, an application window, indicated generally at 130, has two separate list panes 134, 136. Pane 134 is a list of experts, and pane 136 is a list of personal contacts. Any of the contacts in either list can be highlighted, as shown for the first contact in expert list 134 ("John Doe"), and when an expert is highlighted, a number of option buttons 138 enable the user of the application to initiate contact with that expert by selecting appropriate button. Thus, for example, the user of this system has highlighted John Doe and can initiate an instant messaging (IM) session with John Doe, can initiate an email to John Doe, can initiate a conference in which John Doe is brought into the current conversation between the agent and the customer, or can send a file to John Doe. It will be appreciated that these examples of communication options are exemplary only and can be varied in any desired manner.

If the agent has chosen not to have personal contacts shown, then this will be reflected in the session list 38 (FIG. 2) by the personal contacts flag being marked as "off", and there will only be a single pane of experts and no personal contacts.

In the bottom portion of the window 130, a tag recommendation and selection area 140 is provided. The tags are referred to as filters, and the agent is shown the current filters which have been employed to select the list of experts 134, as indicated at 142. In the exemplary interface shown, any of these filters or tags can be removed from the matching algorithm by clicking on the user interface.

In addition, a recommender system suggests a number of additional filters which can be added to further target the list of experts, and by clicking any of these links, the appropriate filter will be added, and the expert recommender system 54 will further query the expert database to return a more targeted list including only those experts having the newly selected filter of tag.

Finally, the agent can choose an entirely different tag by doing an expert keyword search in search box 146. Such a search will return one or more tags which can be chosen by the user to add to the expert filter list 142.

The invention claimed is:

1. A computer-implemented method of managing a list of contacts for presentation to a user of a computer system during a live communications interaction, comprising the steps carried out by said computer system of:
   a) receiving a subject code associated with a remote party;
   b) selecting at least one contact from a record containing details of a plurality of contacts each having one or more selection criteria associated therewith, based on a match between one or more of said selection criteria and said subject code associated with said remote party;
   c) generating a list of contacts for presentation on said computer system, said list of contacts comprising at least said selected contacts;
   d) presenting said list of contacts on said computer system;
   e) monitoring a live communications interaction between said user and said remote party, said live communications interaction being conducted via a communications interface associated with said computer system;
   f) detecting a pattern of data in said monitored live communications interaction wherein said pattern of data comprises a keyword;
   g) while said live communications interaction is in progress, accessing said record;
   h) selecting at least one contact from said record, said selecting being based on said computer system determining a match between one or more of said selection criteria and said pattern of data detected in said monitored live communications interaction, wherein said keyword is a selection criterion for a contact stored in said record; and
   i) modifying said list of contacts by the promotion of said at least one contact upwards in the list of contacts when said at least one contact is already on said list of contacts, said modification occurring without input from the user.

2. A method as claimed in claim 1, wherein said communications interface is a telephony interface and said step of monitoring a live communications interaction comprises conducting speech recognition on a stream of voice data passing through said interface.

3. A method as claimed in claim 1, wherein said communications interface is an interface employed by a human agent of a contact center, and wherein said computer system is a workstation provided for use by said human agent, said workstation also providing a contact center agent interface enabling the agent to control an interaction between said contact center and a remote party also involved in said communications interaction.

4. A method as claimed in claim 1, wherein the method further comprises the steps of:
   j) presenting to said user said list of contacts;
   k) presenting to said user a selection control which is operable to select at least one filter option; and
   l) modifying said list of contacts based on said at least one filter option.

5. An apparatus for managing a list of contacts for presentation to a user of a computer system, the apparatus comprising:
   a) a communications interface for receiving a subject code associated with a remote party;
   b) a selection function operable to selecting at least one contact from a record containing details of a plurality of contacts each having one or more selection criteria associated therewith, based on a match between one or more of said selection criteria and said subject code associated with said remote party;
   c) a list generator generating a list of contacts for presentation on said computer system, said list of contacts comprising at least said selected contacts;
   d) a presentation component operable to present said list of contacts on said computer system;
   e) a monitoring component operable to monitor a live communications interaction between said user and said remote party, said live communications interaction being conducted via a communications interface associated with said computer system;
   f) a detector for detecting a pattern of data in said monitored live communications interaction wherein said pattern of data comprises a keyword;
   g) a memory access device operable during said live communications interaction to access said record;
   h) a selector operable to select at least one contact from said record, based on said selector determining a match between one or more of said selection criteria and said pattern of data detected in said monitored live communications interaction, wherein said keyword is a selection criterion for a contact stored in said record; and
   i) a modifying component operable to modify said list of contacts by the promotion of said at least one contact upwards in the list of contacts when said at least one contact is already on said list of contact, said modification occurring without input from the user.

6. A non-transitory computer readable a storage medium comprising computer-readable program code, when executed in a computerised system, cause the computerised system to perform the steps of a method of managing a list of contacts for presentation to a user of a computer system, the method comprising the steps of:
   a) receiving a subject code associated with a remote party;
   b) selecting at least one contact from a record containing details of a plurality of contacts each having one or more selection criteria associated therewith, based on a match between one or more of said selection criteria and said subject code associated with said remote party;
   c) generating a list of contacts for presentation on said computer system, said list of contacts comprising at least said selected contacts;
   d) presenting said list of contacts on said computer system;
   e) monitoring a live communications interaction between said user and said remote party, said live communications interaction being conducted via a communications interface associated with said computer system;
   f) detecting a pattern of data in said monitored live communications interaction wherein said pattern of data comprises a keyword;
   g) while said live communications interaction is in progress, accessing said record;
   h) selecting at least one contact from said record, said selecting being based on said computer system determining a match between one or more of said selection criteria and said pattern of data detected in said monitored live communications interaction, wherein said keyword is a selection criterion for a contact stored in said record; and
   i) modifying said list of contacts by the promotion of said at least one contact upwards in the list of contacts when said at least one contact is already on said list of contacts, said modification occurring without input from the user.

* * * * *